US009849583B2

(12) United States Patent
Lin

(10) Patent No.: US 9,849,583 B2
(45) Date of Patent: Dec. 26, 2017

(54) STORAGE APPARATUS

(71) Applicant: Pard Hardware Industrial Co., Ltd., Taichung (TW)

(72) Inventor: Ta-Sen Lin, Taichung (TW)

(73) Assignee: Pard Hardware Industrial Co., Ltd., Taichung (TW)

( * ) Notice: Subject to any disclaimer, the term of this patent is extended or adjusted under 35 U.S.C. 154(b) by 0 days.

(21) Appl. No.: 15/168,201

(22) Filed: May 30, 2016

(65) Prior Publication Data

US 2017/0341216 A1 Nov. 30, 2017

(51) Int. Cl.

| | |
|---|---|
| ***A47F 7/00*** | (2006.01) |
| ***A47F 3/14*** | (2006.01) |
| ***A47J 47/00*** | (2006.01) |
| ***B25H 3/02*** | (2006.01) |
| ***A47B 46/00*** | (2006.01) |
| ***A47B 31/00*** | (2006.01) |
| ***B25H 3/06*** | (2006.01) |
| ***A47B 49/00*** | (2006.01) |
| ***A47F 5/05*** | (2006.01) |
| ***A47F 5/13*** | (2006.01) |
| ***B25H 1/12*** | (2006.01) |

(52) U.S. Cl.

CPC ............. *B25H 3/025* (2013.01); *A47B 31/00* (2013.01); *A47B 46/00* (2013.01); *A47B 49/00* (2013.01); *A47F 5/05* (2013.01); *A47F 5/137* (2013.01); *B25H 1/12* (2013.01); *B25H 3/06* (2013.01); *A47B 2031/003* (2013.01)

(58) Field of Classification Search

CPC . B25H 3/025; B25H 3/06; B25H 3/02; B25H 3/023; B25H 3/04; B25H 3/00; B25H 1/0042; B25H 1/12; A47B 31/00; A47B 46/00; A47B 2031/003; A47B 49/00; A47B 63/062; A47B 87/0207; A47F 5/135; A47F 5/137; A47F 5/05; A47F 5/02

USPC ........... 211/85.8, 163, 165, 13.1, 194, 131.1, 211/133.4, 129.1, 126.2, 70.6; 206/349, 206/372

See application file for complete search history.

(56) References Cited

U.S. PATENT DOCUMENTS 405,003 A * 6/1889 Blackledge ............... A47F 3/00 217/8
1,660,521 A * 2/1928 Nordgren ................. B25H 3/06 211/1
2,628,752 A * 2/1953 Corkish ................. B25H 3/025 206/373
4,239,308 A * 12/1980 Bradley ................. A45C 11/24 312/201

(Continued)

*Primary Examiner* — Jennifer E. Novosad

(57) ABSTRACT

A storage apparatus includes trays, a shaft, a base element and two wheel assemblies. The shaft is inserted in the trays to connect the trays to one another so that each of the trays is rotatable between a withdrawn position and a spread position relative to a lower one of the trays. The base element is attached to the shaft. The base element is connected to a second one of the trays by a connecting element. The base element is located below the lowermost tray when the trays overlap one another. The first wheel assembly includes wheels attached to the lowermost tray. The second wheel assembly includes wheels attached to the base element. The wheels cover a first area when the trays overlap one another and cover a second area when the trays fully spread from one another. The first area is smaller than the second area.

18 Claims, 8 Drawing Sheets

(56) References Cited

U.S. PATENT DOCUMENTS

| | | | | | |
|---|---|---|---|---|---|
| 4,971,234 | A * | 11/1990 | Hay | B25H 3/025 | 211/131.1 |
| 4,999,943 | A * | 3/1991 | Crabtree | A01K 97/06 | 43/54.1 |
| 5,259,502 | A * | 11/1993 | Chan | B25H 3/025 | 206/37.3 |
| 5,971,512 | A * | 10/1999 | Swan | B25H 1/10 | 211/131.1 |
| 6,016,927 | A * | 1/2000 | Krupp | A47B 49/004 | 211/126.2 |
| 6,648,390 | B1 * | 11/2003 | Yang | A47B 49/00 | 206/821 |
| 6,705,655 | B2 * | 3/2004 | Yang | A47B 49/00 | 206/821 |
| 6,951,374 | B2 * | 10/2005 | Swenson | A47B 49/00 | 312/283 |
| 8,708,168 | B2 * | 4/2014 | Lin | A47B 49/00 | 108/94 |
| 2002/0185459 | A1 * | 12/2002 | Dietrich | B25H 3/025 | 211/70.6 |
| 2006/0175944 | A1 * | 8/2006 | Peters | B25H 3/025 | 312/249.11 |
| 2007/0102381 | A1 * | 5/2007 | Nguy | B25H 3/025 | 211/70.6 |
| 2007/0125681 | A1 * | 6/2007 | Grubb | B25H 3/025 | 206/503 |
| 2008/0041799 | A1 * | 2/2008 | Nguy | B25H 3/025 | 211/70.6 |
| 2008/0197131 | A1 * | 8/2008 | Lin | B25H 3/025 | 220/23.83 |
| 2008/0297016 | A1 * | 12/2008 | Hsieh | A47B 49/004 | 312/249.2 |
| 2010/0295430 | A1 * | 11/2010 | Cheng | B25H 3/028 | 312/249.11 |
| 2011/0062841 | A1 * | 3/2011 | Penner | B25H 3/025 | 312/249.8 |
| 2012/0326406 | A1 * | 12/2012 | Lifshitz | B25H 3/02 | 280/47.19 |

* cited by examiner

STORAGE APPARATUS

BACKGROUND OF INVENTION

1. Field of Invention

The present invention relates to tools and, more particularly, to a storage apparatus for containing tools.

2. Related Prior Art

Taiwanese Patent I402148 discloses a storage apparatus that includes several trays rotationally supported on a vertical shaft that is connected to a base element at a lower end. Two lager wheels are attached to the lowermost tray while three smaller wheels are attached to the base element. In a position relative to the vertical shaft, the trays overlap one another so that each of the trays, except for the uppermost tray, is covered by another tray. In use, the lowermost tray is moved to a substantially opposite position relative to the vertical shaft to have the larger and smaller wheels cover a large area to stably support the trays. Then, the other trays are moved to other positions so that none of them is covered by any other tray.

The present invention is therefore intended to obviate or at least alleviate the problems encountered in prior art.

SUMMARY OF INVENTION

It is the primary objective of the present invention to provide a storage apparatus.

To achieve the foregoing objective, the storage apparatus includes trays, a shaft, a base element and two wheel assemblies. Each of the trays includes a supporting plate, a confining plate formed on the supporting plate, and a lug formed on an external side of the confining plate. The shaft is inserted in the lugs of the trays to connect the trays to one another so that each of the trays is rotatable between a withdrawn position and a spread position relative to a lower one of the trays. The base element is attached to a lower end of the shaft. The base element is connected to the confining plate of a second one of the trays by a connecting element. The base element is located below the lowermost tray when the trays overlap one another. The first wheel assembly includes wheels attached to a lower face of the lowermost tray. The second wheel assembly includes wheels attached to a lower face of the base element. The wheels of the first and second wheel assemblies cover a first area when the trays overlap one another and cover a second area when the trays fully spread from one another. The first area is smaller than the second area.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
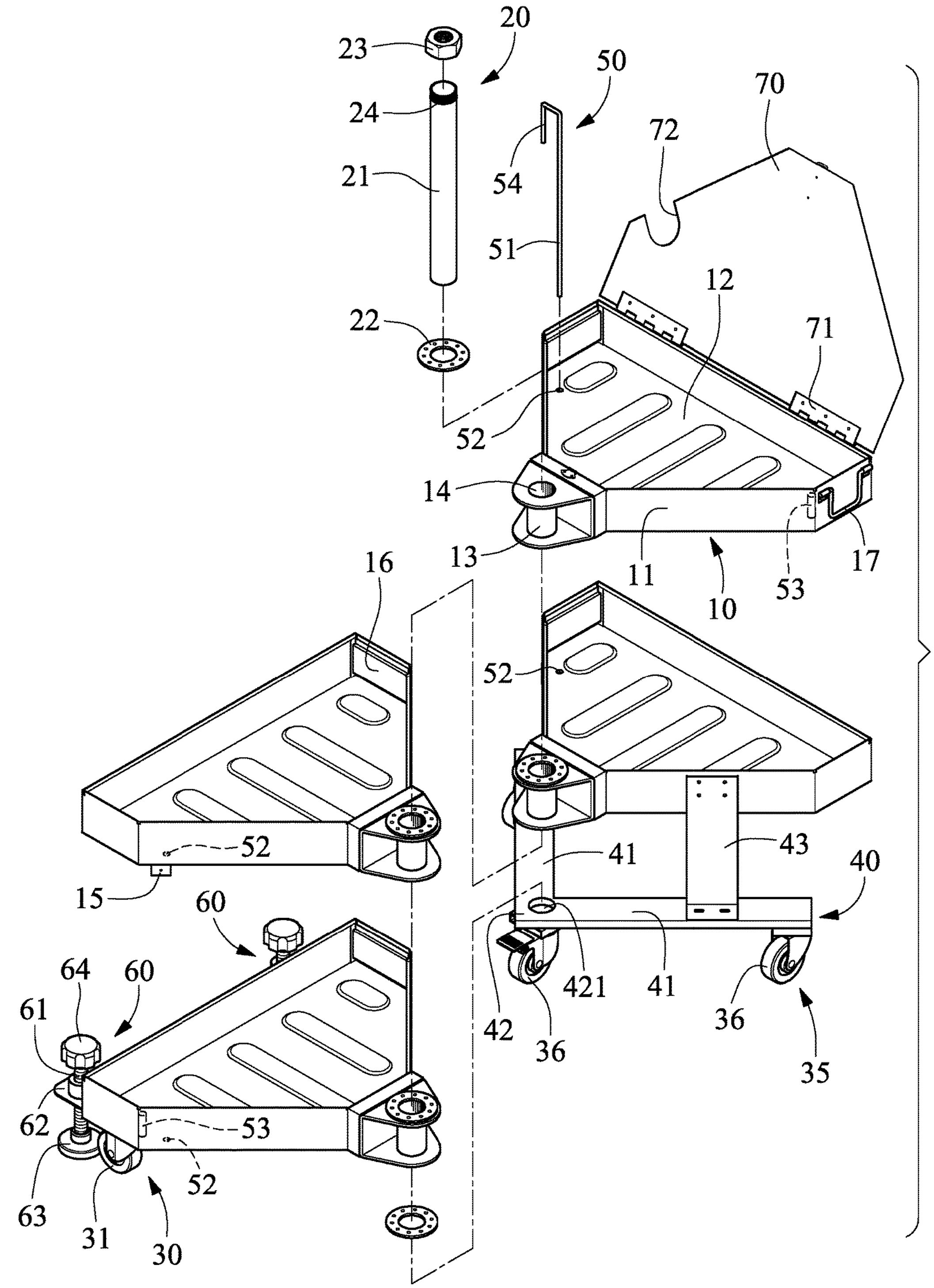
FIG. 1 is an exploded view of a storage apparatus according to the preferred embodiment of the present invention.
Figure 2:
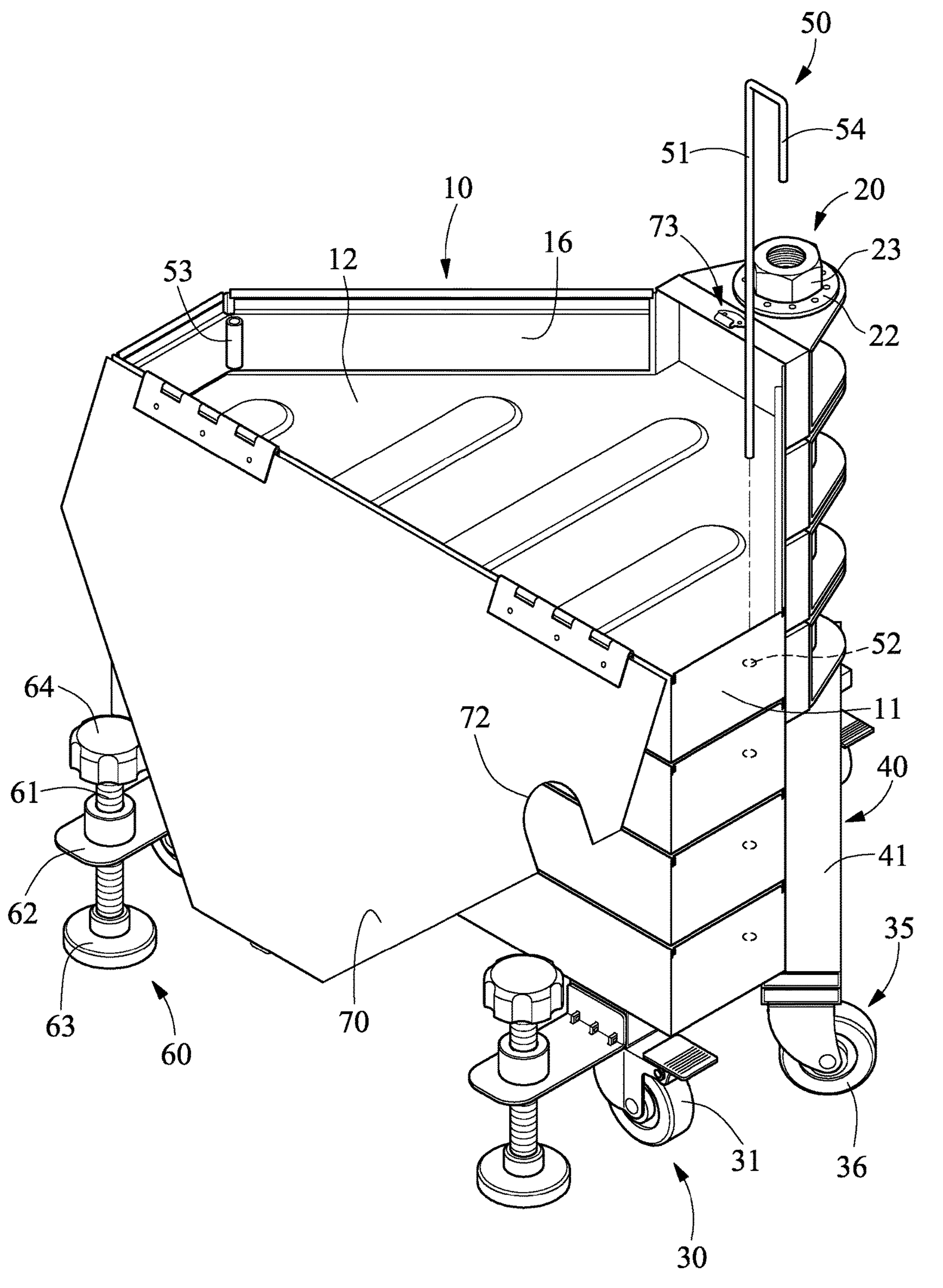
FIG. 2 is a perspective view of the storage apparatus illustrated in FIG. 1.
Figure 3:
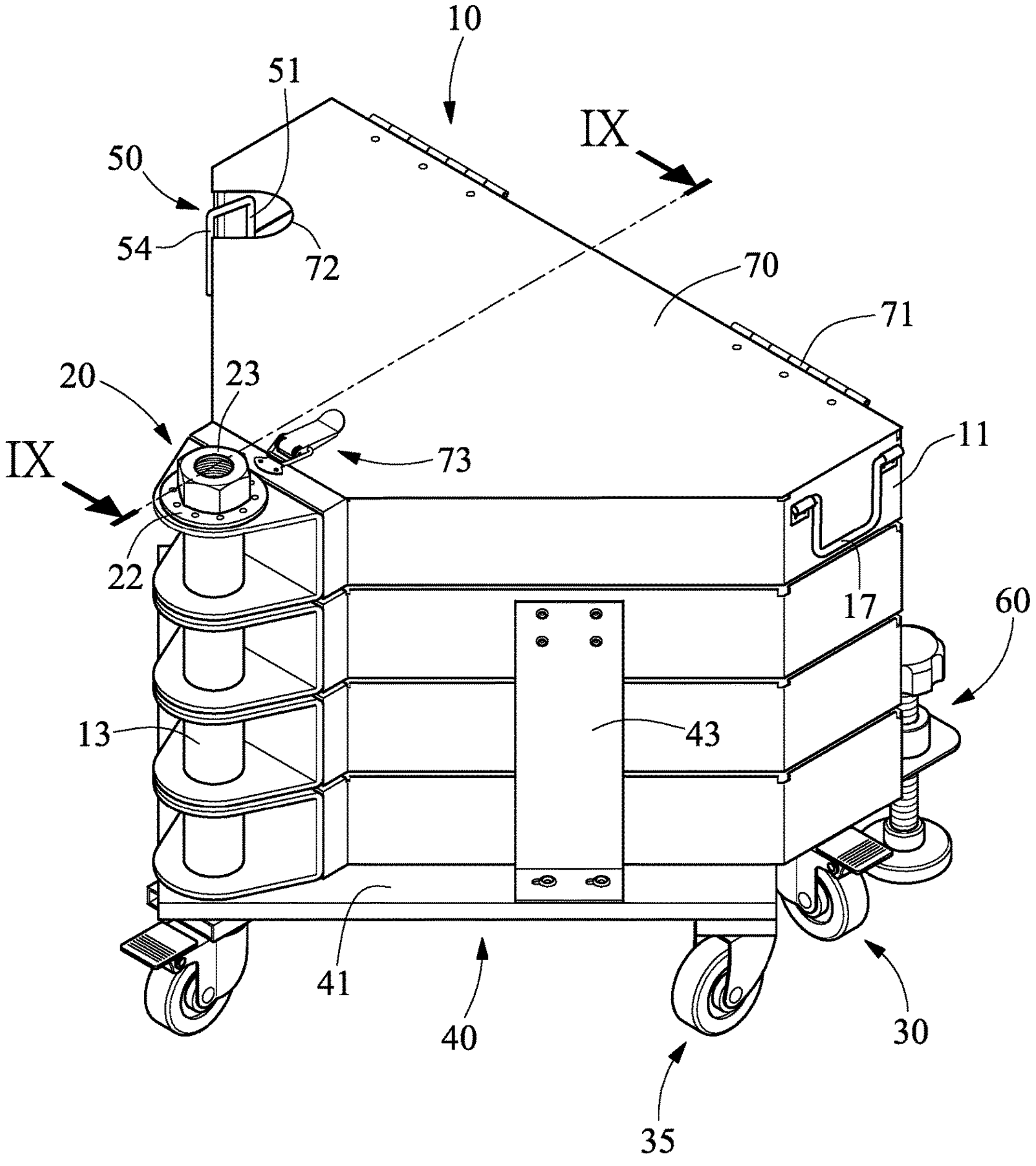
FIG. 3 is a perspective view of the storage apparatus in another position than shown in FIG. 1.
Figure 4:
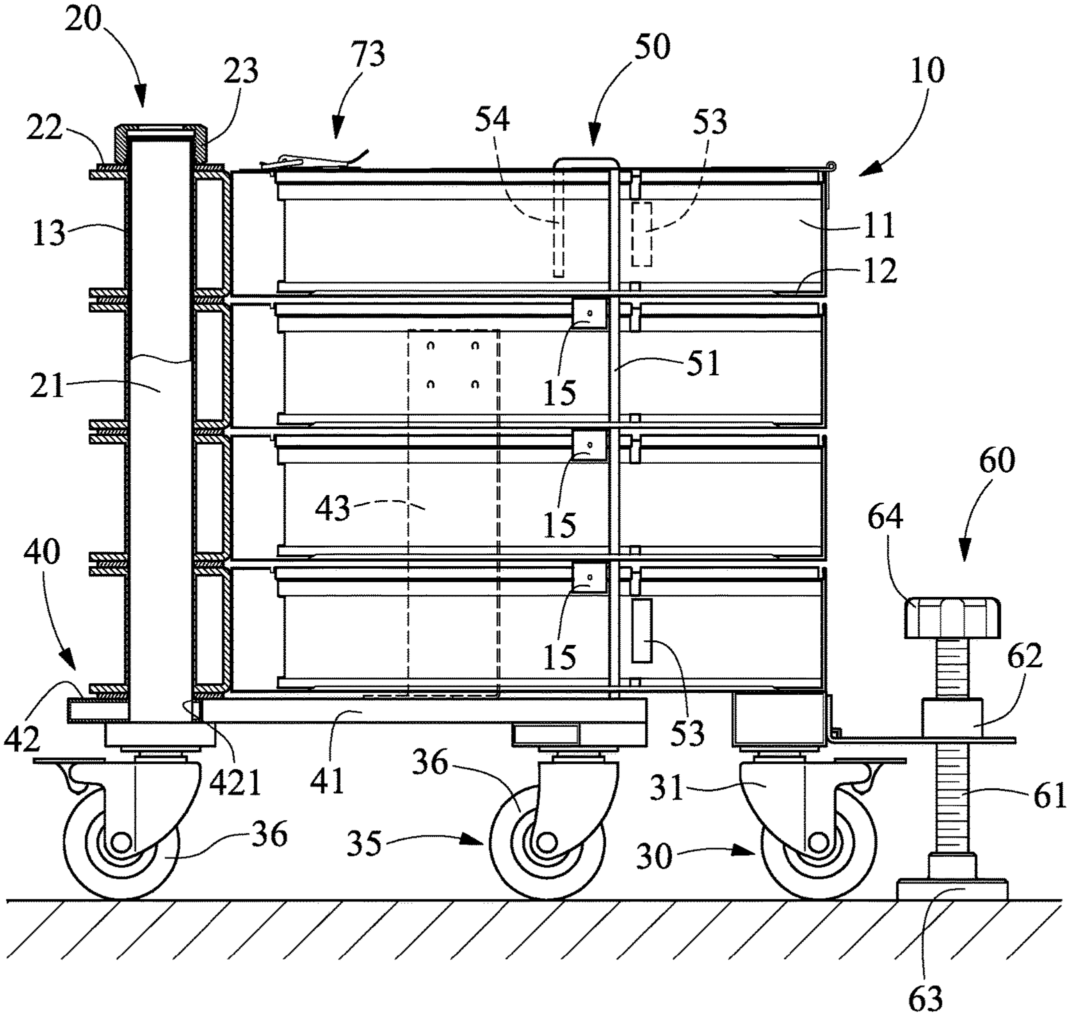
FIG. 4 is a cross-sectional view of the shown in FIG. 3.
Figure 5:
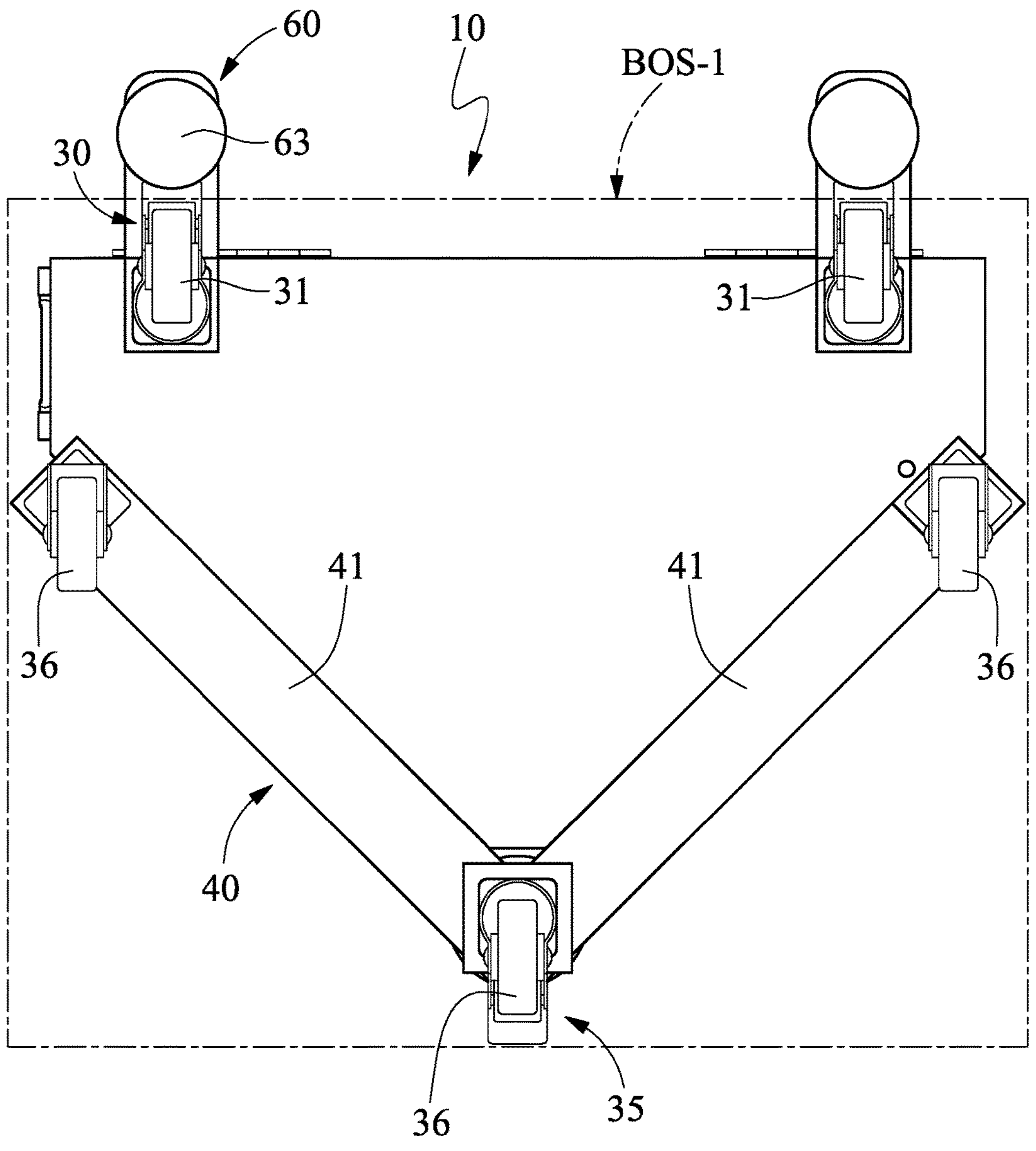
FIG. 5 is a bottom view of the storage apparatus illustrated in FIG. 3.

Referring to FIGS. 1 to 5, a storage apparatus includes trays 10, a shaft assembly 20, a first wheel assembly 30, a second wheel assembly 35, a base element 40, an angle-retaining assembly 50, a positioning assembly 60 and a cover 70 according to the preferred embodiment of the present invention. Each of the trays 10 includes a supporting plate 12, a confining plate 11 formed on the supporting plate 12, and a lug 13 formed on or attached to one of the confining plate 11. The supporting plate 12 is a polygonal plate that extends horizontally. The confining plate 11 extends from the top of the supporting plate 12 and extends along the edge of the supporting plate 12. The lug 13 is formed with a vertical tunnel 14. A limiting fin 15 vertically extends from the bottom of the supporting plate 12. A reinforcement element 16 is formed on an internal side of the confining plate 11. A handle 17 is attached to an external side of the confining plate 11 of the uppermost tray 10.

The shaft assembly 20 includes a shaft 21, several smoothing elements 22 and a fastener 23. The shaft 21 extends throughout the tunnel 14 of the lug 13 of each of the trays 10 so that each of the trays 10 is rotationally connected to the shaft 21. The smoothing elements 22 are in an annular shape. The shaft 21 extends throughout each of the smoothing elements 22 while each of the smoothing elements 22 is provided between the lugs 13 of two adjacent ones of the trays 10. Each of the smoothing elements 22 is adapted for smoothing rotation of the two corresponding trays 10 relative to each another by reducing friction between the lugs 13 of the two corresponding trays 10. The fastener 23 is preferably a nut engaged with a threaded section 24 of the shaft 21 near an upper end. Thus, the lugs 13 and hence the trays 10 cannot be translated up and down long the shaft 21.

The first wheel assembly 30 includes two wheels 31. The wheels 31 are connected to the bottom of the supporting plate 12 of the lowermost tray 10. Each of the wheels 31 is at a proper distance from the lug 13 of the lowermost tray 10.

The base element 40 is a V-shaped element including two prongs 41 extending from a shaft-connecting portion 42. The shaft-connecting portion 42 preferably includes a tunnel 421. The shaft 21 extends in the tunnel 421. One of the prongs 41 includes a connecting element 43 connected to the confining plate 11 of a second one of the trays 10, counted from the top, so that the base element 40 is connected to and movable together with the second tray 10.

The second wheel assembly 35 includes three wheels 36. One of the wheels 36 is attached to the bottom of the shaft-connecting portion 42 while each other wheel 35 is connected to the bottom of a corresponding one of the prongs 41. Each of the wheels 36 is at a proper distance from any other wheel 36.

The angle-retaining assembly 50 includes a pin 51, an aperture 52 made in the supporting plate 12 of each of the trays 10, and a hollow stem 53 formed on the top of the supporting plate 12 of each of the uppermost and lowermost trays 10. The pin 51 includes a crook 54 formed at an upper end.

The apertures 52 are located along a vertical line when the trays 10 overlap one another. The pin 51 can be inserted in the apertures 52 of the trays 10 to prevent the trays 10 from rotation relative to one another, thereby keeping the trays 10 overlapping one another. In that case, the crook 54 of the pin 51 can be laid on the confining plate 11 of the uppermost tray 10 to retain the elevation of the pin 51.

The hollow stems 53 extend along a vertical line as the uppermost tray 10 is angularly biased from the lowermost tray 10. The pin 51 can be inserted in the hollow stems 53 to prevent the uppermost tray 10 from rotation relative to the lowermost tray 10, thereby keeping the uppermost tray 10 annularly biased from the lowermost trays 10.

The positioning assembly 60 is connected to the lowermost tray 10. The positioning assembly 60 includes a positioning ring 62 formed on or attached to the lowermost tray 10, a post 61 connected to the positioning ring 62, a pad 63 connected to a lower end of the post 61, and a knob 64 connected to an upper end of the post 61. In an alternative embodiment, the positioning ring 62 is formed or connected to a portion of the first wheel assembly 30, which is connected to the lowermost tray 10.

The post 61 is vertically movable relative to the positioning ring 62 between an upper position and a lower position. As the post 61 is in the upper position, the pad 63 is located away from a floor to allow the wheel assembly 30 to roll on the floor. As the post 61 is in the lower position, the pad 63 is laid on the floor to prevent the wheel assembly 30 from rolling on the floor. To this end, the pad 63 is preferably made of a skid-proof material. Preferably, the post 61 is a threaded bolt and the positioning ring 62 is a nut engaged with the threaded bolt. The knob 64 is operable to rotate the post 61 relative to the positioning ring 62 to move the post 61 relative to the positioning ring 62.

The cover 70 is pivotally connected to the confining plate 11 of the uppermost tray 10 by two hinges 71. The cover 70 can be pivoted between a closing position and an opening position. In the closing position, the cover 70 closes the uppermost tray 10. The cover 70 includes a cutout 72 for receiving the crook 54 of the pin 51 so that the crook 54 of the pin 51 does not interfere with the pivoting of the cover 70 to the closing position. A buckle 73 is provided for locking the cover 70 to the uppermost tray 10.

Referring to FIGS. 2 through 5, the trays 10 overlap one another. The pin 51 is inserted in the aperture 52 of each of the trays 10 to keep the trays 10 from rotation relative to one another. The cutout 72 of the cover 70 receives the crook 54 of the pin 51 so that the cover 70 does not interfere with the pin 51. The limiting fin 15 of each of the trays 10 is placed against an internal side of the confining plate 11 of a lower one of the trays 10. The base element 40 is connected to the confining plate 11 of the second tray 10 by the connecting element 43 so that the base element 40 is located below the lowermost tray 10. The wheels 31 of the first wheel assembly 30 and the wheels 36 of the second wheel assembly 35 are located below the lowermost tray 10. The first wheel assembly 30 and the second wheel assembly 35 cover an area BOS-1. The pads 63 of the posts 61 are laid on the floor.

The posts 61 can be moved to the upper position to move the pads 63 from the floor. Then, a user can carry the storage apparatus by the handle 17.

Figure 6:
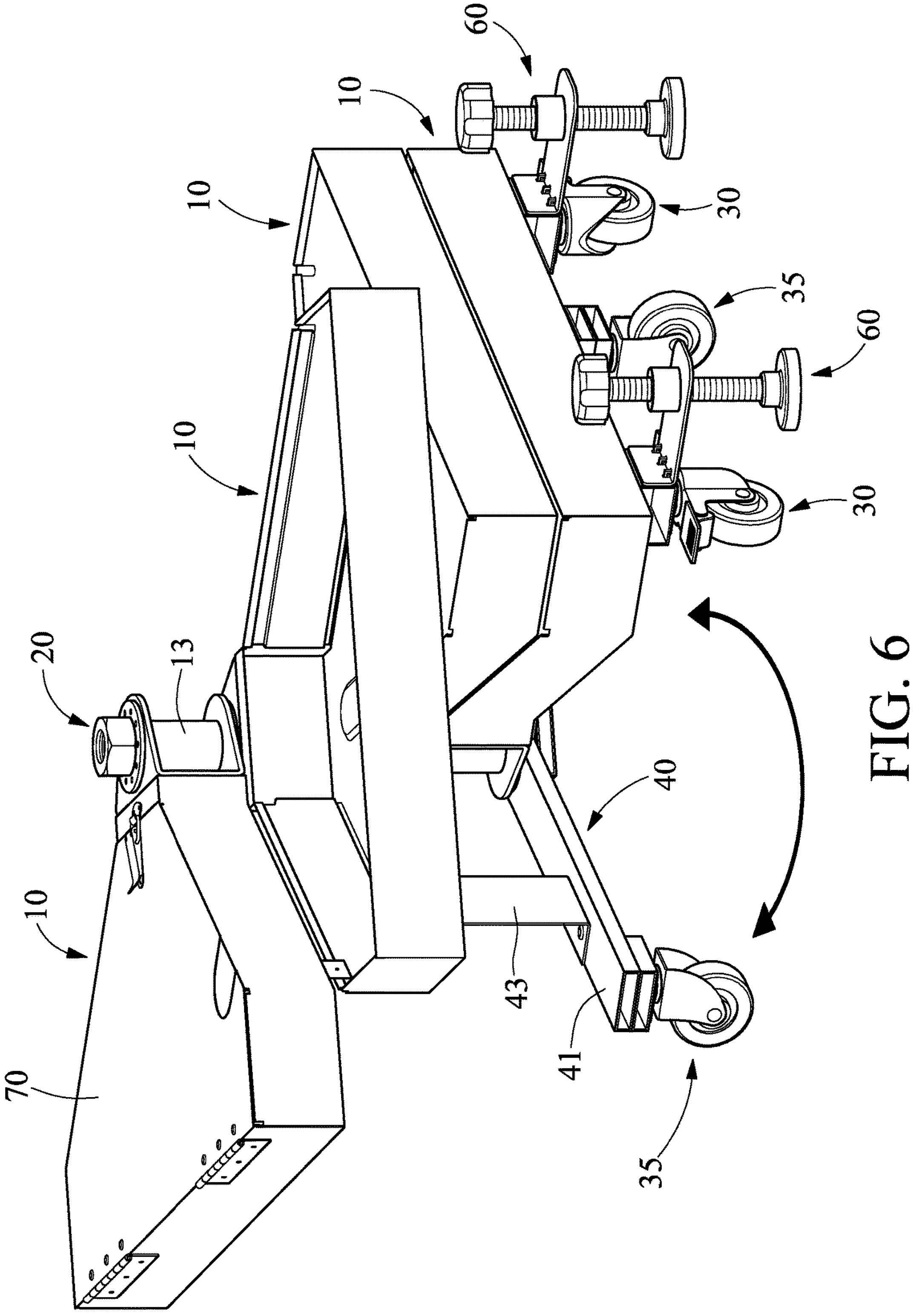
FIG. 6 is a perspective view of the storage apparatus in another position than shown in FIG. 3.

Referring to FIG. 6, the pin 51 is removed from the apertures 52. The uppermost tray 10 is rotated about the shaft 21. The limiting fin 15 of the uppermost tray 10 abuts against the confining plate 11 of the second tray 10 so that the uppermost tray 10 and the second tray 10 rotate together after the uppermost tray 10 is rotated for 90° in the preferred embodiment. The limiting fin 15 of the second tray 10 abuts against the confining plate 11 of the third tray 10 so that the second and third trays 10 rotate together after the second tray 10 is rotated for 90° in the preferred embodiment. The limiting fin 15 of the third tray 10 abuts against the confining plate 11 of the lowermost tray 10 so that the third tray 10 and the lowermost tray 10 rotate together after the third tray 10 is rotated for 90° in the preferred embodiment. The base element 40 is rotated together with the second 10 because of their interconnection by the connecting element 43. Now, the first wheel assembly 30 and the second wheel assembly 35 cover another area BOS-2 that expands or shrinks as the trays 10 are spread or withdrawn.

Figure 7:
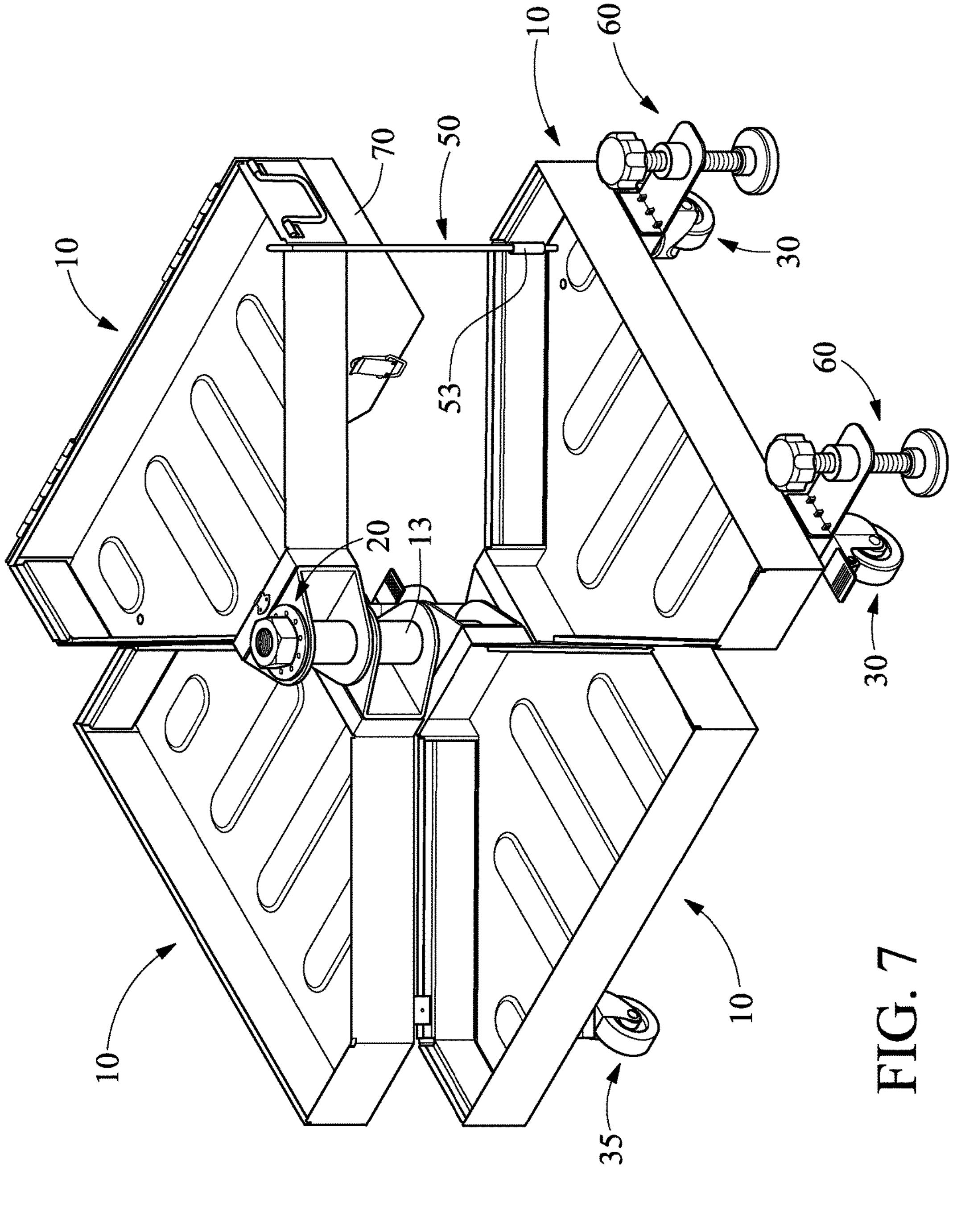
FIG. 7 is a perspective view of the storage apparatus in another position than shown in FIG. 6.
Figure 8:
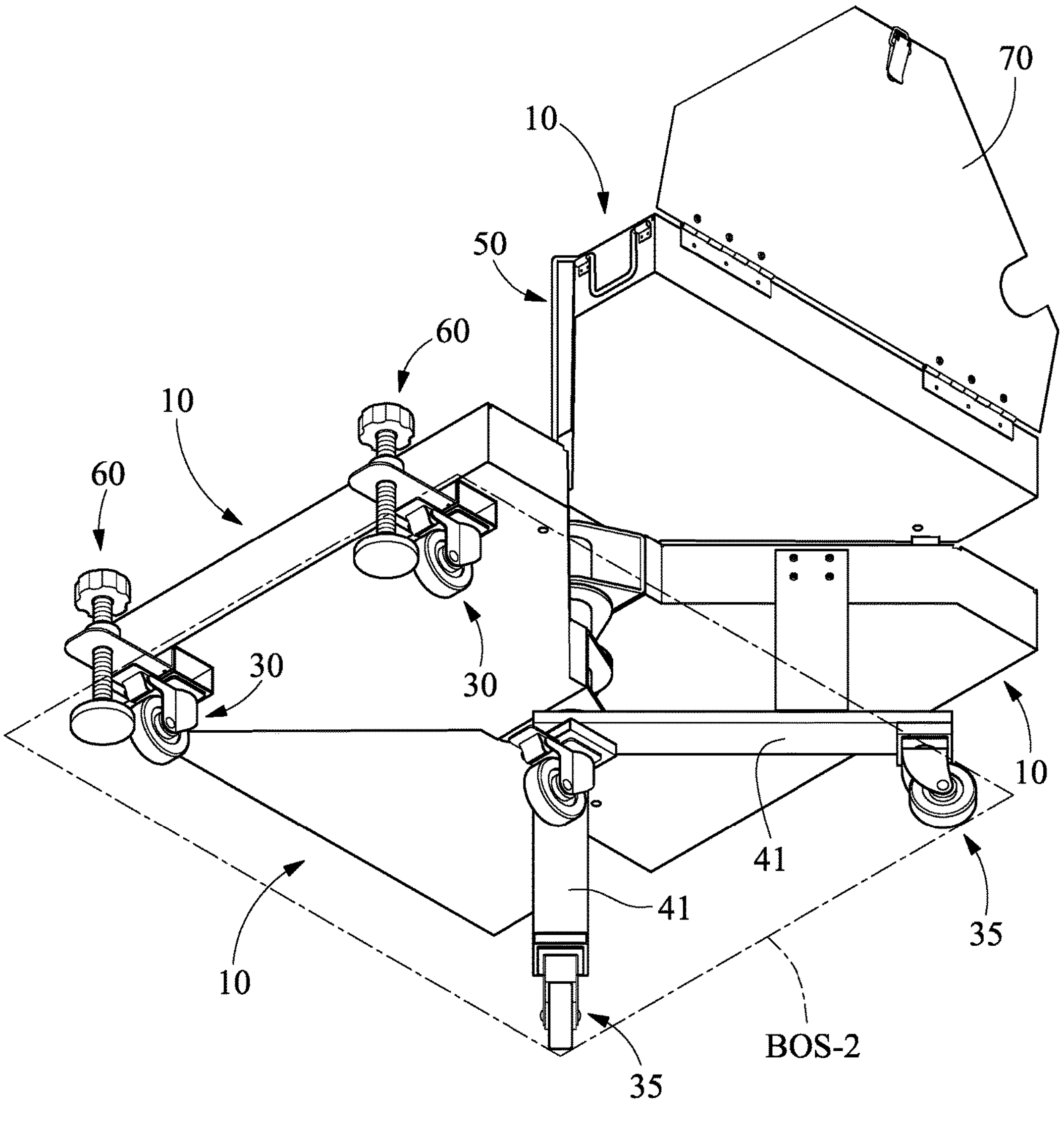
FIG. 8 is another perspective view of the storage apparatus shown in FIG. 7.

Referring to FIGS. 7 and 8, the uppermost tray 10 is rotated for 270°, and the second tray 10 is rotated for 180°, and the third tray 10 is rotated for 90°. The lowermost tray 10 and the first wheel assembly 30 are kept in position because the post 61 abuts against the floor. Thus, none of the trays 10 is located on any other tray 10. To keep the trays 10 spread, the pin 51 is inserted in the hollow stems 53. With the trays 10 spread, the base element 40 is located below the second tray 10.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A storage apparatus comprising:

trays each comprising a supporting plate, a confining plate formed on the supporting plate, and a lug formed on an external side of the confining plate;

a shaft inserted in the lugs of the trays to connect the trays to one another so that each of the trays is rotatable between a withdrawn position whereby the trays overlap one another and a spread position relative to a lowermost one of the trays;

a base element attached to a lower end of the shaft, wherein the base element is connected to the confining plate of a second one of the trays by a connecting element, wherein the base element is located below the lowermost tray when the trays overlap one another;

a first wheel assembly comprising wheels attached to a lower face of the lowermost tray; and a second wheel assembly comprising wheels attached to a lower face of the base element, wherein the wheels of the first and second wheel assemblies cover a first area when the trays overlap one another and cover a second area when the trays fully spread from one another, wherein the first area is smaller than the second area.

2. The storage apparatus according to claim 1, wherein each of the trays except for the lowermost tray comprises a limiting fin formed on the respective confining plate and adapted for abutment against an internal side of the confining plate of a lower one of the trays when the tray is located in the spread position relative to the lower one of the trays.

3. The storage apparatus according to claim 1, further comprising an angle-retaining assembly adapted for restraining the trays from rotation relative to one another.

4. The storage apparatus according to claim 3, wherein the angle-retaining assembly comprises a pin adapted for insertion in an aperture made in each of the trays to keep the trays from rotation relative to one another.

5. The storage apparatus according to claim 4, wherein the angle-retaining assembly further comprises a crook adapted for hooking the confining plate of an uppermost tray.

6. The storage apparatus according to claim 4, wherein each of an uppermost tray and the lowermost tray comprises a hollow stem for receiving the pin when the uppermost tray is located at an angle relative to the lowermost tray.

7. The storage apparatus according to claim 1, further comprising at least one positioning assembly adapted for contact with a floor to keep the lowermost tray in position.

8. The storage apparatus according to claim 7, wherein the positioning assembly comprises:

a positioning ring connected to the lowermost tray; and a post movably connected to the positioning ring between a lower position in contact with the floor and an upper position away from the floor.

9. The storage apparatus according to claim 8, wherein the post is a threaded bolt, wherein the positioning ring is a nut engaged with the post.

10. The storage apparatus according to claim 8, wherein the positioning assembly further comprises a pad attached to a lower end of the post and adapted for contact with the floor.

11. The storage apparatus according to claim 1, wherein the base element is a horizontal V-shaped element comprising a shaft-connecting portion connected to a lower end of the shaft and at least two prongs extending from the shaft-connecting portion, wherein one of the wheels of the second wheel assembly is connected to the shaft-connecting portion of the base element while the other wheels of the second wheel assembly are connected to the prongs.

12. The storage apparatus according to claim 11, further comprising a connecting element for connecting one of the prongs to the confining plate of the second tray.

13. The storage apparatus according to claim 1, wherein each of the trays comprises a reinforcement element formed on an internal side of the confining plate.

14. The storage apparatus according to claim 1, further comprising smoothing elements provided on the shaft and between the lugs of the trays.

15. The storage apparatus according to claim 1, further comprising a fastener connected to the shaft to keep the shaft in the lugs of the trays.

16. The storage apparatus according to claim 15, wherein the fastener is a nut, wherein the shaft comprises a threaded section engaged with the fastener.

17. The storage apparatus according to claim 1, further comprising a handle connected to the confining plate of one of the trays.

18. The storage apparatus according to claim 1, further comprising:

a cover pivotally connected to the confining plate of an uppermost one of the trays; and a buckle operable for locking the cover to the uppermost tray.

* * * * *